(12) United States Patent
Hildebrand et al.

(10) Patent No.: US 9,739,615 B2
(45) Date of Patent: Aug. 22, 2017

(54) AUTONOMOUS DATA EVACUATION

(71) Applicant: International Business Machines Corporation, Armonk, NY (US)

(72) Inventors: Dean Hildebrand, San Jose, CA (US); John T. Olson, Tucson, AZ (US); Sandeep R. Patil, Pune (IN); Sachin C. Punadikar, Pune (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/659,005

(22) Filed: Mar. 16, 2015

(65) Prior Publication Data

US 2016/0274583 A1    Sep. 22, 2016

(51) Int. Cl.

| | | |
|---|---|---|
| *G21C 21/00* | (2006.01) | |
| *B64C 39/00* | (2006.01) | |
| *G01C 21/00* | (2006.01) | |
| *G06F 11/14* | (2006.01) | |
| *G01C 21/20* | (2006.01) | |

(52) U.S. Cl.
CPC ............ *G01C 21/00* (2013.01); *G01C 21/20* (2013.01); *G06F 11/1451* (2013.01); *G06F 11/1456* (2013.01); *G06F 2201/84* (2013.01)

(58) Field of Classification Search
CPC combination set(s) only.
See application file for complete search history.

(56) References Cited

U.S. PATENT DOCUMENTS

| | | |
|---|---|---|
| 5,575,438 A | 11/1996 | McGonigle et al. |
| 5,695,153 A | 12/1997 | Britton et al. |
| 8,677,193 B2 | 3/2014 | Wilson, Jr. |
| 2002/0060267 A1* | 5/2002 | Yavnai .................. G05D 1/0038 244/23 A |
| 2006/0048641 A1* | 3/2006 | Gonzalez ................ F41H 7/042 89/36.08 |
| 2011/0130636 A1* | 6/2011 | Daniel .................. G08B 25/016 600/301 |
| 2012/0271491 A1 | 10/2012 | Spata |
| 2012/0296874 A1 | 11/2012 | Obernuefemann |
| 2013/0318214 A1 | 11/2013 | Tebay et al. |

FOREIGN PATENT DOCUMENTS

EP         002003057A2 A2    12/2008

OTHER PUBLICATIONS

Ricky Hill et al., "Phantom Network Surveillance UAV / Drone", DEFCON 21, Aug. 2013, 28 pages.

* cited by examiner

*Primary Examiner* — Yonel Beaulieu
(74) *Attorney, Agent, or Firm* — Kunzler Law Group (57) ABSTRACT

For autonomous data evacuation, a compartment is motivated by a propulsion device. A navigation module guides the compartment to a disaster recovery target using the propulsion device in response to an evacuation signal. At least a portion of the navigation module comprises one or more of hardware and executable code, the executable code stored on one or more computer readable storage media.

12 Claims, 9 Drawing Sheets

AUTONOMOUS DATA EVACUATION

FIELD

The subject matter disclosed herein relates to data evacuation and more particularly relates to a time this data evacuation.

BACKGROUND

Digital data transfer may be limited by communication channels.

BRIEF SUMMARY

An apparatus for autonomous data evacuation is disclosed. The apparatus includes a propulsion device, a compartment, and an autonomous navigation module. The compartment is motivated by the propulsion device. The navigation module guides the compartment to a disaster recovery target using the propulsion device in response to an evacuation signal. At least a portion of the navigation module comprises one or more of hardware and executable code, the executable code stored on one or more computer readable storage media. A method and system also perform the functions of the apparatus.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program instructions may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

The description of elements in each figure may refer to elements of proceeding figures. Like numbers refer to like elements in all figures, including alternate embodiments of like elements.

Figure 1:
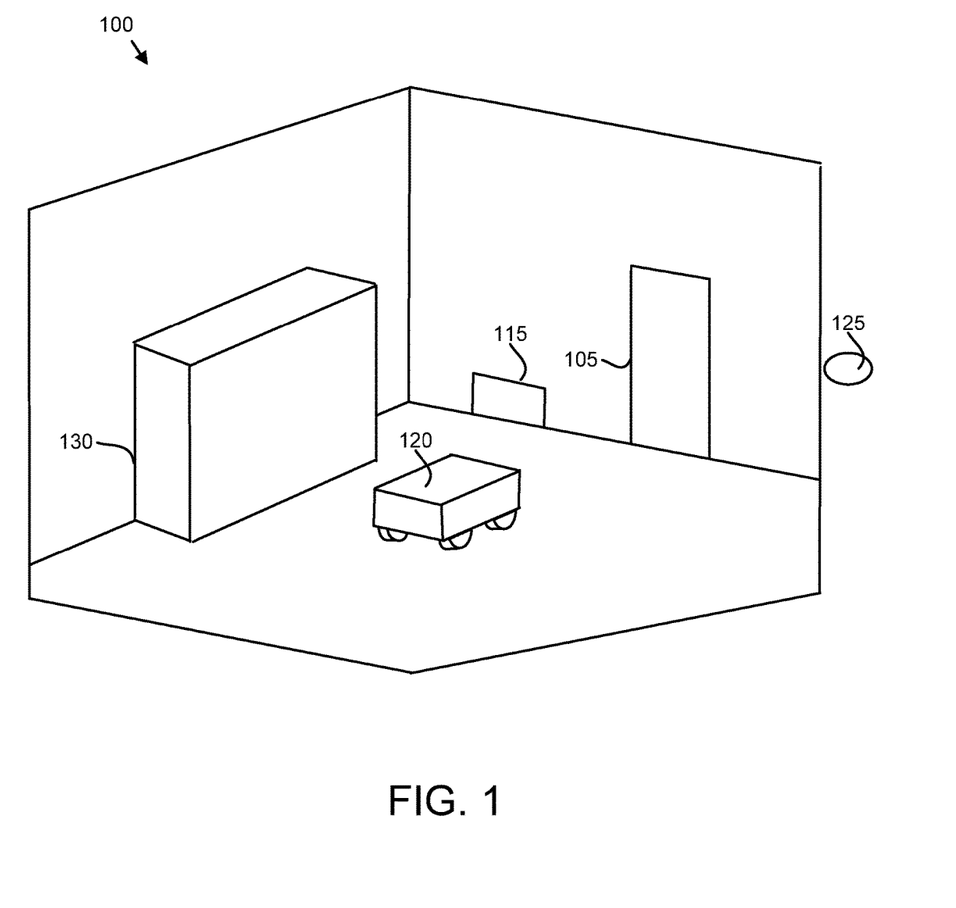
FIG. 1 is a perspective drawing illustrating one embodiment of a data center.

FIG. 1 is a perspective drawing illustrating one embodiment of a data center 100. The data center 100 may include storage hardware 130. For simplicity, one unit of storage hardware 130 is shown. The data center 100 may further include a plurality of servers and/or pain frame computers. The storage hardware 130 may store data from transactions, communications, observations, records, and the like.

The data may be extremely valuable and must be protected against loss. Unfortunately, some threats to the storage hardware 130 may occur within a short time interval. For example, earthquakes, tsunamis, floods, and fires may threaten the storage hardware 130 and all local backup copies. In addition, many threats can destroy data before all recently recorded data may be backed up to another data center 100.

The embodiments described herein autonomously evacuate data from the data center 100 in a compartment, allowing the data to be moved much more rapidly than over a communication channel. In the depicted embodiment, a vehicle 120 includes one or more compartments. The vehicle 120 may carry the compartments from the data center 100 to a disaster recovery target 125. The disaster recovery target 125 may be located outside of the data center 100.

In one embodiment, the vehicle 120 navigates through an exit 105 such as a doorway. The exit 105 may normally used by data center personnel and/or support vehicles to enter and exit the data center 100. Alternatively, the vehicle 120 may navigate out a dedicated egress 115 that is configured to accommodate the vehicle 120. In the depicted embodiment, the dedicated egress 115 is a small doorway that is not usable by data center personnel. As a result, the vehicle 120 does not interfere with the evacuation of data center personnel from the data center 100 when exiting through the dedicated egress 115.

Figure 2A:
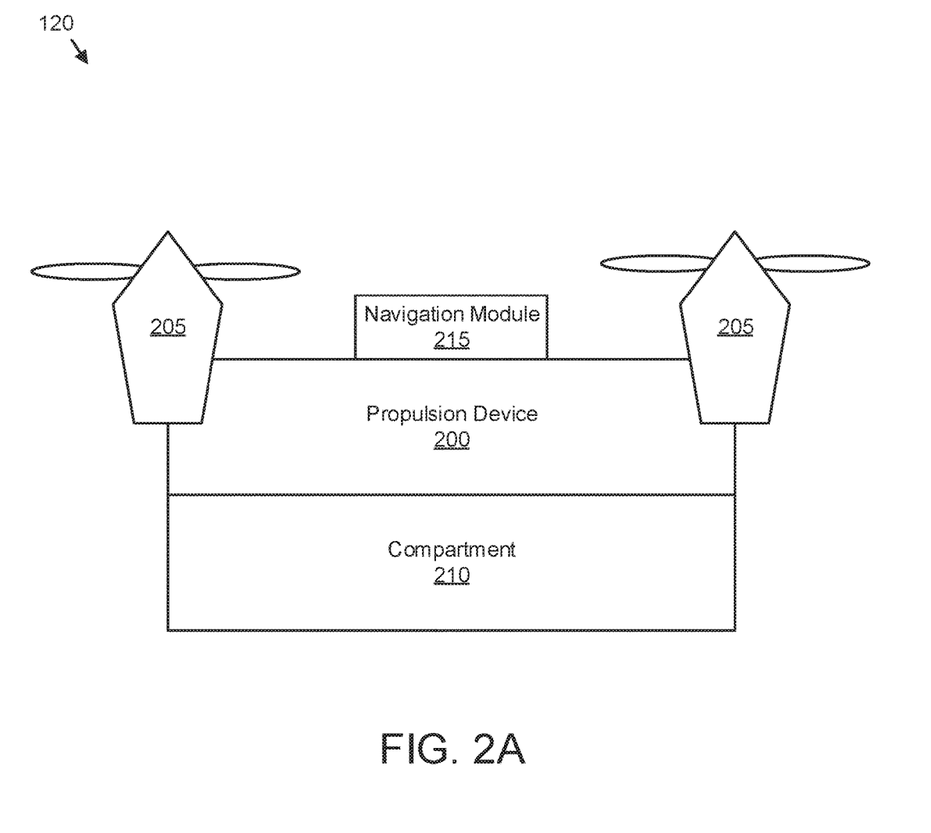
FIG. 2A is a side view drawing illustrating one embodiment of a rotary-driven flying vehicle.

FIG. 2A is a side view drawing illustrating one embodiment of a rotary-driven flying vehicle 120. The rotary-driven flying vehicle 120 includes a navigation module 215, a propulsion device 220, and a storage device 210.

The compartment 210 may store data. The compartment 210 may be a hard disk drive, a semiconductor compartment, an optical compartment, a micromechanical compartment, a holographic compartment, or combinations thereof. In one embodiment, the compartment 210 backs up a data source such as the storage hardware 130. In a certain embodiment, the compartment 210 stores data that has not yet been backed up to a remote data center 100.

The compartment 210 is a cache for the storage hardware 130. The compartment 210 may store the data until the data is backed up. The data may then be written to the storage hardware 130. Alternatively, the compartment 210 may be a buffer for the storage hardware 130. In one embodiment, the compartment 210 is an initial stage of a hierarchical storage system. Data may be first stored in the compartment 210 and later migrated to other storage elements within the storage hierarchy system of the storage hardware 130.

Alternatively, the compartment 210 may be embodied in the storage hardware 130. For example, a compartment may be one or more hard disk drives of the storage hardware 130. A loader may load the compartment 210 onto the propulsion device 200. The propulsion device 200 may motivate the compartment 210 to exit the data center 100. In one embodiment, the compartment 210 is integral to the propulsion device 200.

The navigation module 215 may guide the compartment 210 to the disaster recovery target 125 using the propulsion device 200. In one embodiment, the navigation module 215 guides the compartment 210 to the disaster recovery target 125 using the propulsion device 200 in response to an evacuation signal. In addition, the navigation module 215 may guide the propulsion device 200 to motivate the compartment 210 to the disaster recovery target 125 without further direction from data center personnel, security systems, and/or electronic controls. The evacuation signal may be an audible alarm, an electronic evacuation signal, a signal from a manual control, or the like.

The navigation module 215 may be autonomous and may comprise one or more of hardware and executable code. The hardware may be semiconductor gates, discrete electrical components, or the like. The executable code may be stored on one or more computer readable storage media such as a memory and may be executed by a processor.

In addition, the navigation module 215 may include sensors, positioning devices, and the like. For example, the navigation module 215 may include one or more video cameras and a global positioning system (GPS). The navigation module 215 may guide the compartment 210 from the current position to the disaster recovery target 125. In addition, the navigation module 215 may employ the video cameras to detect and avoid obstacles in route to the disaster recovery target 125.

The propulsion device 200 includes multiple rotors 205. The rotors 205 may rotate to lift the vehicle 120. The propulsion device 200 may include an energy source such as a battery, a fuel tank, and the like. The propulsion device 200 may further include an engine, a force generator, or the like.

In the depicted embodiment, the navigation module 215 may receive the evacuation signal. The compartment 210 may be in physical communication with the propulsion device 200 when the evacuation signal is received. The compartment 210 may store data for the storage hardware 130. In one embodiment, the propulsion device 200 disconnects a physical communication channel between the compartment 210 and the storage hardware 130. The autonomous navigation module 215 may cause the propulsion device 200 to activate the rotors 205 and navigate the vehicle 120 through a dedicated egress 115. The autonomous navigation module 215 may further navigate the vehicle 120 to the disaster recovery target 125. The disaster recovery target 125 may be a designated landing zone. In one embodiment, the disaster recovery target 125 is a secure area.

Alternatively, a loader may load the compartment 210 onto the propulsion device 200 in response to the evacuation signal. For example, the loader may disconnect a hard disk drive compartment 210 from the storage hardware 130 and load the hard disk drive compartment 210 onto the vehicle 120. The navigation module 215 may direct the propulsion device 200 to motivate the compartment 210 through a dedicated egress 115 to the disaster recovery target 125. Because the vehicle 120 does not use the exit 105 or traverse the space used by data center personnel, emergency personnel, and other vehicles, the vehicle 120 does not interfere with the evacuation of the data center 100. However, the vehicle 120 does rapidly evacuate a high quantity of data stored on the compartment 210 to the disaster recovery target 125.

Additional embodiments of vehicles 120 are described hereafter. The compartment 210 of each vehicle 120 may store data for the storage hardware 130, communicating with the storage hardware 130 over a communication channel. The communication channel may be severed by the propulsion device 200 when the propulsion device 200 motivates the compartment 210 to evacuate the data center 100. Alternatively, a loader may load the compartment 210 onto the propulsion device 200 and the propulsion device 200 may motivate the compartment 210 to evacuate the data center 100.

Figure 2B:
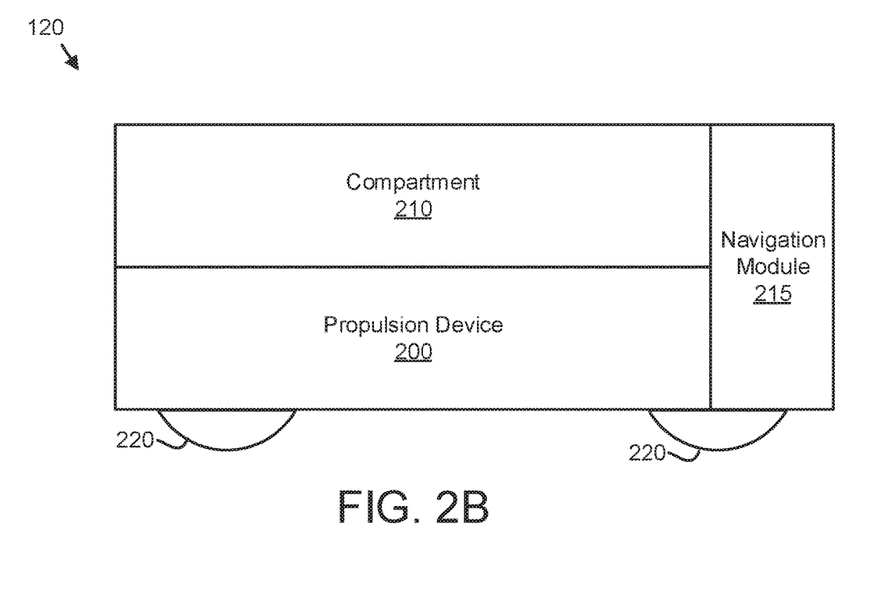
FIG. 2B is a side view drawing illustrating one embodiment of a wheeled vehicle.

FIG. 2B is a side view drawing illustrating one embodiment of a wheeled vehicle 120. The wheeled vehicle 120 includes the compartment 210, the propulsion device 200, and the navigation module 215. The propulsion device 200 may drive two or more wheels 220 that motivate the compartment 210. The navigation module 215 may use sensors to guide the compartment 210 from the data center 100 to the disaster recovery target 125. For example, the navigation module 215 may direct the propulsion unit 202 motivate the compartment 210 through the dedicated egress 115 to the disaster recovery target 125.

Figure 2C:
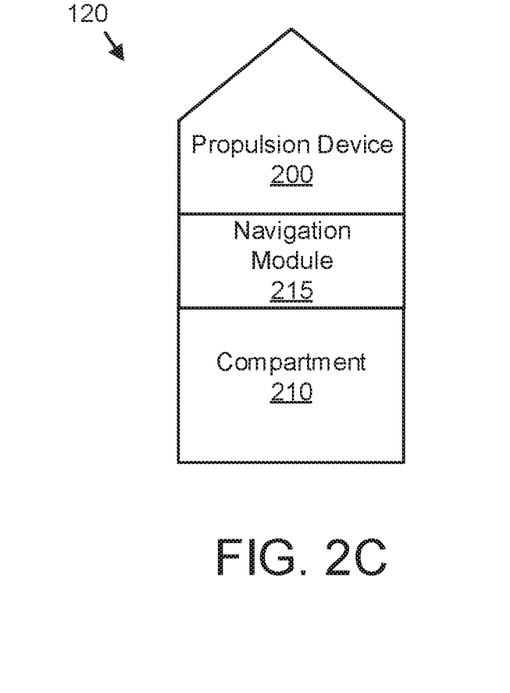
FIG. 2C is a side view drawing illustrating one embodiment of a ballistic vehicle.

FIG. 2C is a side view drawing illustrating one embodiment of a ballistic vehicle 120. The ballistic vehicle 120 may shot along a ballistic trajectory to evacuate the compartment 210 from the data center 100. In the depicted embodiment, the ballistic vehicle 120 includes the propulsion device 200, the navigation module 215, and the compartment 210.

In one embodiment, the propulsion device 200 includes a recovery mechanism such as a parachute or a glider. Alternatively, the propulsion device 200 may include a gas generator for accelerating the ballistic vehicle 120. The propulsion device 200 may accelerate the ballistic vehicle 120 to evacuate the data center 100. In addition, the propulsion device 200 may include control surfaces that may alter the trajectory of the ballistic vehicle 120.

The navigation module 215 may guide the propulsion device 200 to accelerate the ballistic vehicle 120 in response to the evacuation signal. In addition, the navigation module 215 modify the control surfaces of the propulsion device 200 to direct a ballistic vehicle 120 to the disaster recovery target 125. In one embodiment, the navigation module 215 deploys the recovery mechanism to land the ballistic vehicle 120 safely at the disaster recovery target 125.

Figure 2D:
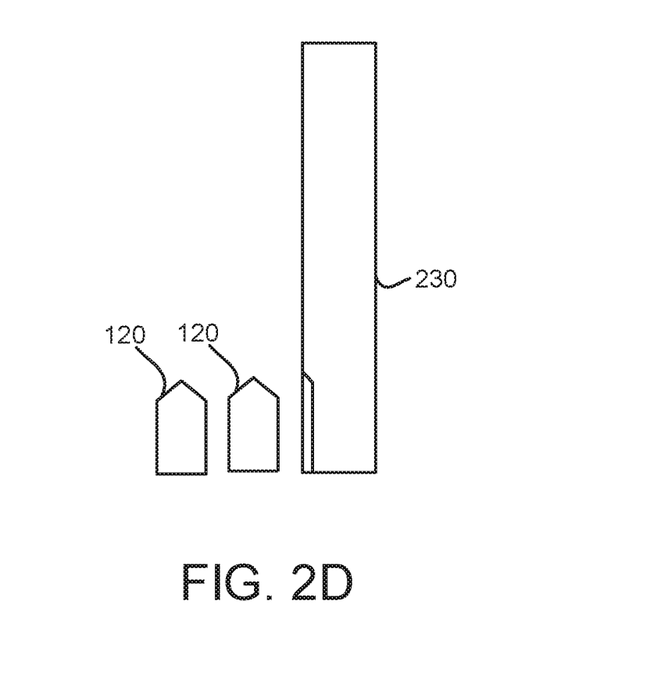
FIG. 2D is a side view drawing illustrating one embodiment of a ballistic launch tube.

FIG. 2D is a side view drawing illustrating one embodiment of a ballistic launch tube 230. The ballistic vehicles 120 of FIG. 2C may be loaded into the ballistic launch tube 230. The ballistic launch tube 230 may employ compressed gas, electromagnetic acceleration, or the like to accelerate the ballistic vehicle 120 from the data center 100.

Figure 2E:
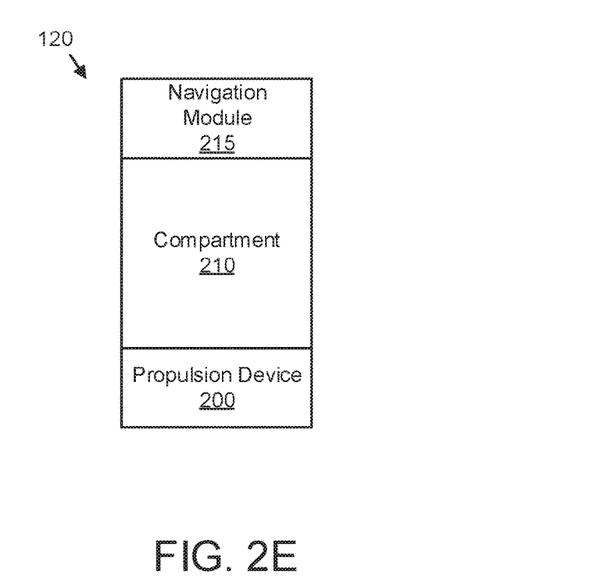
FIG. 2E is a side view drawing illustrating one embodiment of a pneumatic vehicle.

FIG. 2E is a side view drawing illustrating one embodiment of a pneumatic vehicle 120. In the depicted embodiment, the vehicle 120 includes the navigation module 215, the propulsion device 200, and the compartment 210. The pneumatic vehicle 120 may be motivated in a pneumatic tube as will be illustrated in FIG. 2F. The propulsion device 200 may include a breaking mechanism to slow and/or stop the pneumatic vehicle 120.

In one embodiment, the navigation module 215 determines that the pneumatic vehicle 120 has arrived at the disaster recovery target 125. The navigation module 215 may direct the propulsion device 200 to stop the pneumatic vehicle 120 at the disaster recovery target 125 using the breaking mechanism.

The navigation module 215 may further detect an end of the pneumatic tube and/or another pneumatic vehicle 120. The navigation module 215 may direct the propulsion device 200 to stop the pneumatic vehicle 122 prevent collision with the end of the pneumatic tube and/or the other pneumatic vehicle 120.

Figure 2F:
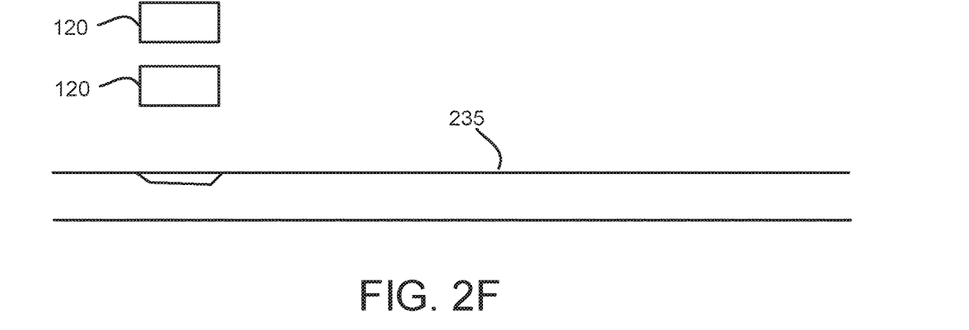
FIG. 2F is a side view drawing illustrating one embodiment of a pneumatic tube and pneumatic vehicles.

FIG. 2F is a side view drawing illustrating one embodiment of a pneumatic tube 235 and pneumatic vehicles 120. The pneumatic vehicles 120 may be loaded into the pneumatic tube 235. The pneumatic tube 235 may motivate the pneumatic vehicle 120 to evacuate the data center 100.

Figure 2G:
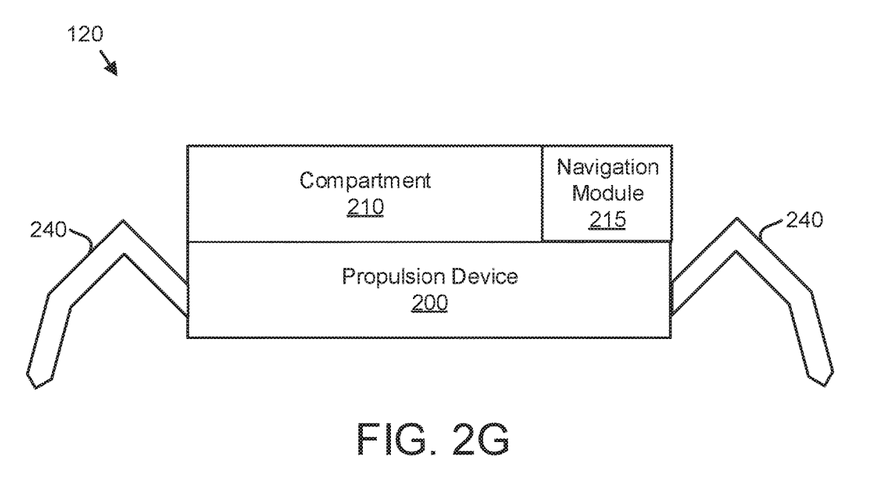
FIG. 2G is a side view drawing illustrating one embodiment of a legged vehicle.

FIG. 2G is a side view drawing illustrating one embodiment of a legged vehicle 120. The propulsion device 200 includes legs 240. The propulsion device 200 may manipulate the legs 242 motivate the compartment 210. The navigation module 215 may guide the propulsion device 202 motivate the compartment 210 to the disaster recovery target 125. The navigation module 215 may employ the GPS to navigate from a current location to the disaster recovery target 125. In addition, the navigation module 215 may employ sensors to avoid obstacles.

Figure 2H:
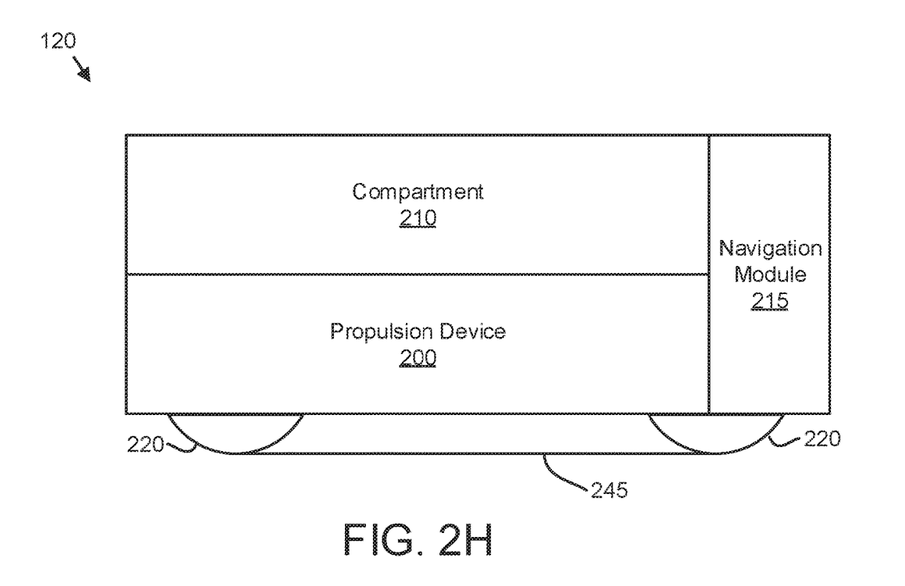
FIG. 2H is a side view drawing illustrating one embodiment of a tracked vehicle.

FIG. 2H is a side view drawing illustrating one embodiment of a tracked vehicle 120. In the depicted embodiment, wheels 220 drive a track 245 that motivates the tracked vehicle 120.

Figure 3A:
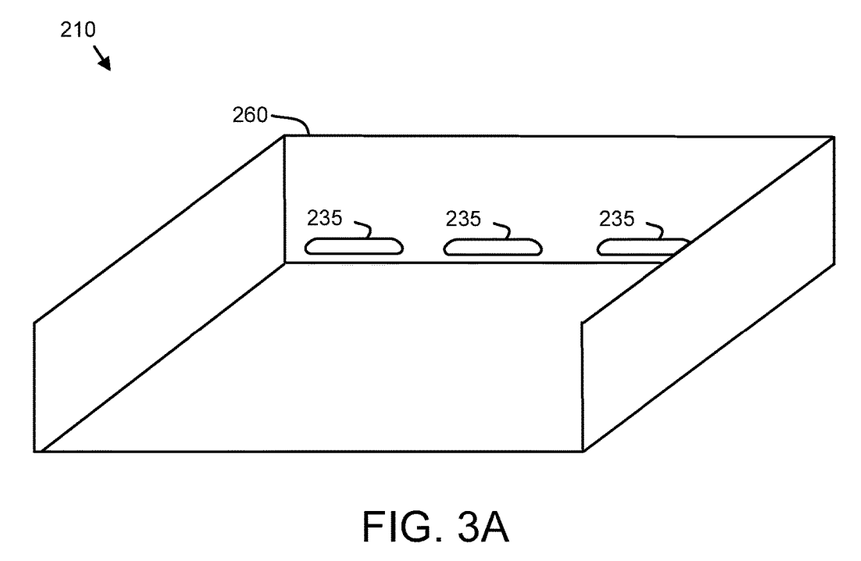
FIG. 3A is a perspective drawing illustrating one embodiment of a storage tray.

FIG. 3A is a perspective drawing illustrating one embodiment of a storage tray 260. The storage tray 260 may be disposed in a vehicle 120. In one embodiment, the storage tray 260 is in physical communication with and/or integral to the propulsion device 200. The storage tray 260 may include one or more connectors 235. Each connector 235 may connect the compartment 210 to a communication channel such as a network. One or more compartments 210 may be disposed in the storage tray 260. The compartments 210 may communicate with the storage hardware 130 through the connectors 235 and the communication channels.

Figure 3B:
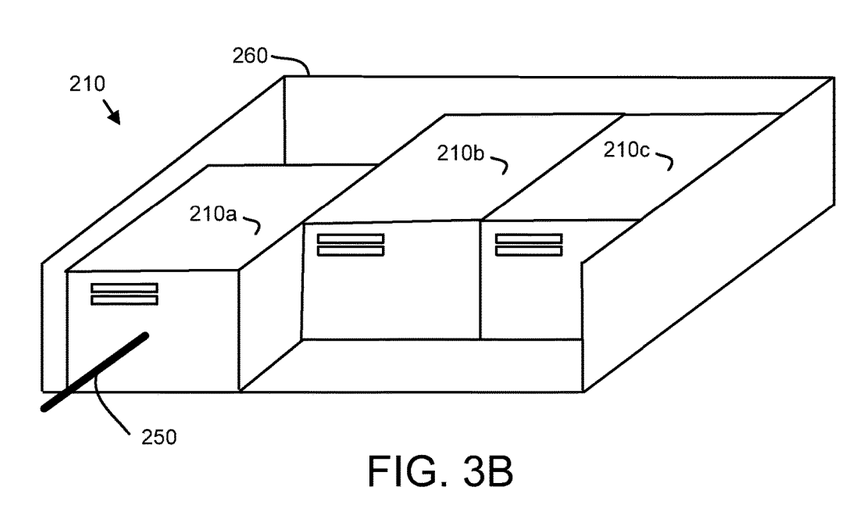
FIG. 3B is a perspective drawing illustrating one embodiment of loading compartments.

FIG. 3B is a perspective drawing illustrating one embodiment of loading compartments 210. In the depicted embodiment, a loader 250 loads a first compartment 210*a* into the storage tray 260. The loader 250 may be a mechanical actuator.

For example, the compartments 210 may originally reside within the storage hardware 130. The loader 250 may move the compartments 210 into the storage tray 260 of the vehicle 120. The vehicle 120 may then evacuate the compartments 210 from the data center 100.

Figure 4A:
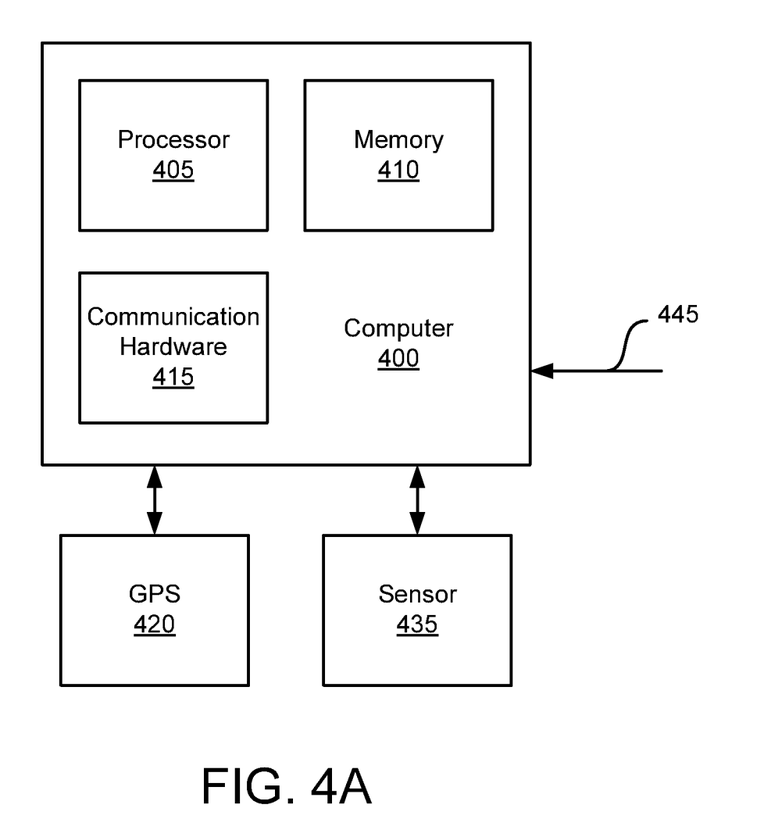
FIG. 4A is a schematic block diagram illustrating one embodiment of a computer.

FIG. 4A is a schematic block diagram illustrating one embodiment of a computer 400. The computer 400 may be embodied in the navigation module 215. In the depicted embodiment, the computer 400 includes a processor 405, a memory 410, and communication hardware 415. The memory 410 may be a semiconductor compartment, a hard disk drive, an optical compartment, a micromechanical compartment, or combinations thereof. The memory 410 may store code such as program instructions. The processor 405 may execute the code. The communication hardware 415 may communicate with other devices such as a global positioning system 420 and one or more sensors 435. In addition, the communication hardware 415 may receive the evacuation signal 445.

The evacuation signal 445 may be a digital code communicated over a communication channel, the output of a manual control, and/or an audible signal.

The global positioning system 420 may determine a current position of the vehicle 120. In addition, the global positioning system 420 may determine a direction to the disaster recovery target 125. The sensor 435 may include one or more video cameras, echolocation sensors, proximity sensors, and the like. The sensor 435 may be used to detect potential obstacles.

Figure 4B:
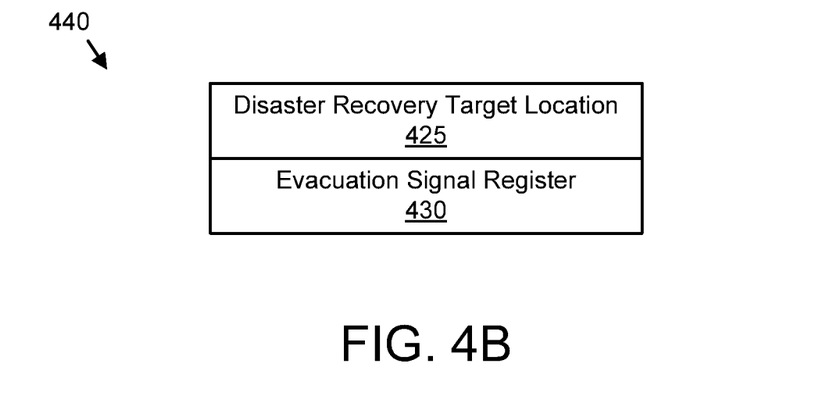
FIG. 4B is a schematic block diagram illustrating one embodiment of evacuation data.

FIG. 4B is a schematic block diagram illustrating one embodiment of evacuation data 440. The evacuation data 440 may be organized as a data structure in the memory 410. In the depicted embodiment, the evacuation data 440 includes a disaster recovery target location 425 and an evacuation signal register 430.

The disaster recovery target location 425 may specify the coordinates of the disaster recovery target 125. The evacuation signal register 430 may store a status of the evacuation signal 445. In one embodiment, the evacuation signal 445 may include alternate coordinates for the disaster recovery target 125 that are stored in the disaster recovery target location 425.

Figure 5:
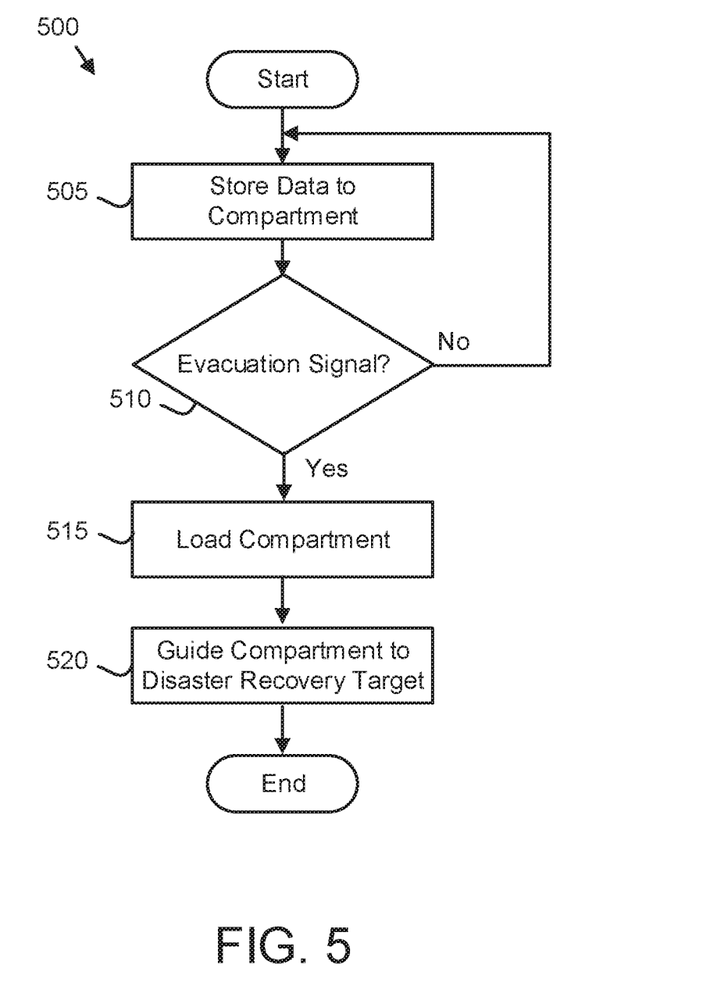
FIG. 5 is a schematic flow chart diagram illustrating one embodiment of an autonomous data evacuation method.

FIG. 5 is a schematic flow chart diagram illustrating one embodiment of an autonomous data evacuation method 500. The method 500 may autonomously evacuate data in the compartment 210 from the data center 100. The method 500 may be a vehicle. Alternatively, the method 500 may be performed as directed by the processor 405. In addition, the method 500 may be performed by computer readable storage medium with code such as program instructions embedded there with. The program instructions may be readable/executable by the processor 405 to cause the processor 405 to perform the functions of the method 500.

The method 500 starts, and in one embodiment, the storage hardware 130 stores 505 data to the compartment 210. The data may be stored 505 to the compartment 210 as part of a backup operation. For example, the storage hardware 130 may regularly backup data to the compartment 210.

Alternatively, the data may be initially stored 505 on the compartment 210 before being migrated to an alternate location in the storage hardware 130. For example, new data writes may be initially stored in the compartment 210. After the new data is mirrored to a remote data center 100, the new data may be migrated from the compartment 210 to another location within the storage hardware 130.

In one embodiment, the compartment 210 stores 505 the data as part of the storage hardware 130 until the compartment 210 is loaded into the vehicle 120. For example, the compartment 210 may be disposed in a rack of the storage hardware 130 before being loaded to the vehicle 120.

The navigation module 215 may determine 510 if the evacuation signal 445 is received. If the evacuation signal 445 is not received, the compartment 210 continues to store 505 data.

If the evacuation signal 445 is received, the loader 250 may load 515 the compartment 210 into the vehicle 120 if the compartment 210 is not already disposed within the vehicle 120. In one embodiment, the propulsion device 200 may disconnect one or more communication channels between the storage hardware 130 and the compartment 210.

The navigation module 215 may direct the propulsion device 200 to guide 520 the compartment 210 to the disaster recovery target 125 specified by the disaster recovery target location 425 and the method 500 ends. In one embodiment, the navigation module 215 determines a current location of the vehicle 120 and the direction of travel to the disaster recovery target 125. The navigation module 215 may navigate the propulsion device 220 in the direction of the disaster recovery target 125. The navigation module 215 may detect one or more obstacles with the sensor 435 and adjust the course of the vehicle 120 to avoid the obstacles. Upon arriving at the disaster recovery target 125, the navigation module 215 may deactivate the propulsion device 200.

The vehicle 120 and the compartment 210 may be recovered at the disaster recovery target 125. The data stored in the compartment 210 may be used to recover the data in operations of the data center 100. In one embodiment, the data stored in a compartment 210 is used to update backup data at a remote data center 100.

By physically evacuating data in the compartment 210, the embodiments allow large quantities of data to be rapidly evacuated from the data center 100 without the use of communication channels which may be compromised in a disaster. As a result, large quantities of data including data that is not been backed up remotely may be saved under even extreme conditions.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
    a vehicle;
    a compartment that stores data in a data center and is motivated by the vehicle, wherein the vehicle is selected from the group consisting of a rotary-drive flying vehicle, a wheeled vehicle, a tracked vehicle, a vehicle with multiple legs, a pneumatic vehicle, and a ballistic vehicle;
    wherein the vehicle comprises a processor and a memory storing code that is executable by the processor to direct the vehicle to evacuate the compartment from the data center to a secure disaster recovery target located outside the data center using the vehicle in response to an evacuation signal to evacuate the data center.

2. The apparatus of claim 1, wherein the compartment backs up a data source.

3. The apparatus of claim 1, the apparatus further comprising a loader that loads the compartment to the vehicle in response to the evacuation signal.

4. The apparatus of claim 1, wherein the compartment is integral to the propulsion device.

5. A method for autonomous data evacuation comprising:
    motivating a compartment that stores data in a data center with a vehicle, wherein the vehicle is selected from the group consisting of a rotary-drive flying vehicle, a wheeled vehicle, a tracked vehicle, a vehicle with multiple legs, a pneumatic vehicle, and a ballistic vehicle; and
    evacuating the compartment from the data center to a secure disaster recovery target located outside the data center using the vehicle in response to an evacuation signal to evacuate the data center.

6. The method of claim 5, wherein the compartment backs up a data source.

7. The method of claim 5, the method further comprising loading the compartment to the vehicle in response to the evacuation signal.

8. The method of claim 5, wherein the compartment is integral to the vehicle.

9. A system comprising:
    storage hardware storing data;
    a vehicle, wherein the vehicle is selected from the group consisting of a rotary-drive flying vehicle, a wheeled vehicle, a tracked vehicle, a vehicle with multiple legs, a pneumatic vehicle, and a ballistic vehicle;
    a compartment that stores the data for the storage hardware in a data center and is motivated by the vehicle;
    wherein the vehicle comprises a processor and a memory storing code that is executable by the processor to direct the vehicle to evacuate the compartment from the data center to a secure disaster recovery target located outside the data center using the vehicle in response to an evacuation signal to evacuate the data center.

10. The system of claim 9, wherein the compartment backs up a data source.

11. The system of claim 9, the system further comprising a loader that loads the compartment to the vehicle in response to the evacuation signal.

12. The system of claim 9, wherein the compartment is integral to the vehicle.

* * * * *